UNITED STATES PATENT OFFICE.

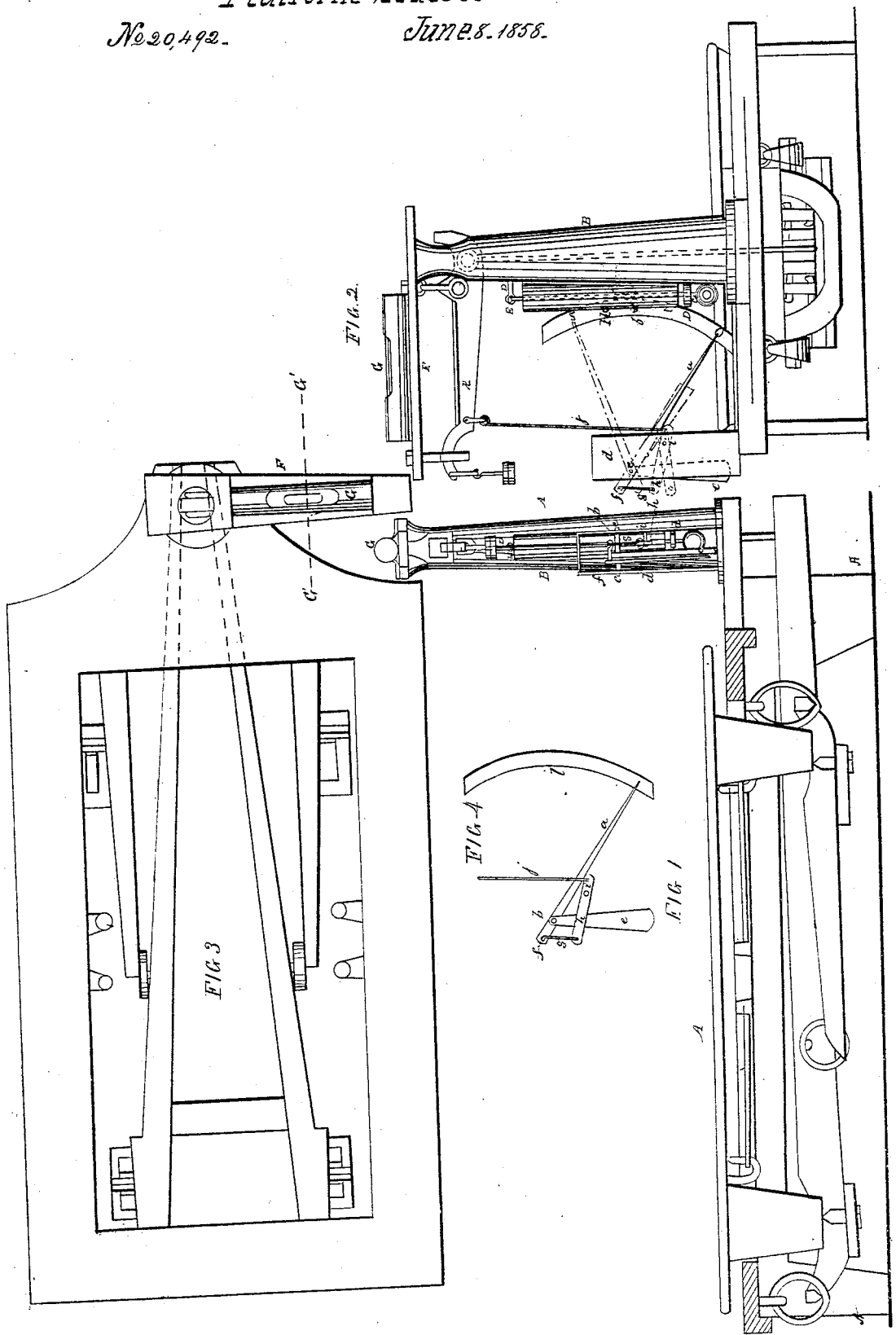

J. F. KEELER, OF CLEVELAND, OHIO.

PLATFORM-SCALES.

Specification of Letters Patent No. 20,492, dated June 8, 1858.

*To all whom it may concern:*

Be it known that I, J. F. KEELER, of Cleveland, in the county of Cuyahoga and State of Ohio, have invented new and useful Improvements in Platform-Scales; and I do hereby declare that the following is a full and exact description thereof, reference being had to the accompanying drawings, in which—

Figure 1 is a side elevation; Fig. 2 an end view; Fig. 3 a plan view, and Fig. 4 a detached section.

Like letters refer to like parts in the different views.

The nature of my improvement consists in constructing platform scales with a spirit level, or plumb line, so arranged, that the level of the scales, or any variation therefrom, will be indicated and corrected, as the more perfect the level condition of the scale, the more correctly will the weight be shown; also, in combining with the platform scale, a weighted lever or indicator, in such a manner that the platform scales may be used with, or without it.

A, A, A, A, represents a general view of a platform scale, with the usual appurtenances of levers, links, pivots, weights, beams, &c., to the side of whose standard B, Figs. 1 and 2, is hung the plumb line C, by means of the arm D, the connection E, of the arm and line, forming a joint so that it will move in any direction, and thereby showing the level of the scale, or any variation therefrom, as the plumb line is connected to the standard so that it will be vertical to the level plane of the platform. The standard is firmly secured to the frame of the scales.

To the arm, or extension F, of the standard, is connected the spirit level G, in such a manner, that it may be turned to any horizontal position from G to G'. The position shown at G, Fig. 3, will level the scales, transversely, and by turning the level to G, G', the scale may be leveled longitudinally.

The plumb line is perpendicular to the plane of the platform and scales when level, and the spirit level by changing its position, as before stated, will show the transverse and longitudinal plane of the platform and scale when level, or any variation from it, so that the scales may be leveled up.

The plumb line is inclosed in the case H, to protect it from injury; below this case, and attached to the standard, is the guide I, in which, is a circular hole, through which passes the plumb line. This guide, and plumb line, is so connected, to the standard, that the longitudinal and transverse level will be shown by the position of the plumb line in the guide, and any angle of variation will also be indicated in the same manner.

Another feature of my improvement consists in combining with a platform scale, a weighted pointer or indicator, as shown in Figs. 1, 2, and 4, the pointer $a$ is attached to the shaft $b$, which has knife edged journals at $c$, $c$, in the stand $d$; to the shaft $b$, is also hung the weighted pendulum, or lever, $e$. From the outer end of the pointer $a$, extends an arm $f$, to which is attached the connecting rod $g$, which rod connects the pointer $a$, to the lever $h$. The bearings on the arm $f$, and lever $h$, at the point of connection, of the rod $g$, are knife edged. The lever $h$, works upon an arm or wrist $i$, which extends from the stand $d$; to the short arm of the lever $h$, is attached the rod $j$ which is connected to the beam $k$, this connection of the beam to the lever $h$, by the rod $j$, may be arranged in any convenient manner, so that this rod may be easily connected and disconnected, whereby the platform scales may be used with or without this apparatus.

$l$, is an index plate, upon which the pointer $a$, indicates the various amounts weighed.

The advantages of this construction, are, that it can be used either as a self indicating scale, or, as an ordinary platform balance, as may, at the time, best suit the convenience of the operator. It is well known to those accustomed to using both of these kinds of scales, that draughts of any given fixed weight such as 100 bushels of wheat, or 40 pounds of sugar can be most speedily weighed by the ordinary platform scale, since the beam will rise at the moment when the requisite quantity has been placed on the scale, provided the proper weights had previously been placed on the beam. While the self acting scale would require a cessation in putting on the material, to be weighed, until the index finger ceased to vibrate, then if the right weight is not found to be on the scales, after putting on or taking off, as the case may require, another trial has to be made, and so on, perhaps several times, before the desired weight is indicated. In such cases the self indicating attachment should be detached, and the scale balanced and used in the ordinary way. But when the quantities to be weighed are not given, or fixed, as is usually the case, in weighing loaded wheelbarrows and other vehicles, then the weight can generally be ascertained, on a self indicating scale, by a single trial, while the common balance would usually require several trials, and consequently, the self indicator should be attached to the scale, and used, as herein represented.

What I claim as my improvement, and desire to secure by Letters Patent, is—

1. The application of a device for leveling the bearings of platform scales, when arranged substantially as described.

2. Also, I claim combining with platform scales, a weighted lever, or indicator, in such a manner that the platform scales may be used either with or without it substantially as before set forth.

J. F. KEELER.

Witnesses:
J. E. INGERSOLL,
T. F. GALWEY.